United States Patent [19]

Licari

[11] Patent Number: 4,484,033
[45] Date of Patent: Nov. 20, 1984

[54] RACK FOR A WALL-MOUNTED TELEPHONE

[76] Inventor: Yaffa Licari, 875 Ocean Ave., Elberon, N.J. 07740

[21] Appl. No.: 339,429

[22] Filed: Jan. 15, 1982

[51] Int. Cl.³ .............................................. A47F 7/00
[52] U.S. Cl. .............................. 179/146 R; 179/178; 211/86; 206/499
[58] Field of Search ............... 179/100 C, 100 R, 147, 179/178, 183, 146 R; 211/86, 87, 88; 206/499, 515, 503, 505, 518

[56] References Cited

U.S. PATENT DOCUMENTS 3,085,134  4/1963  Bissonnette et al. ................ 179/146
3,845,252  10/1974 Wooters .......................... 179/146 R
4,362,248  12/1982 Vilanova .............................. 211/50

OTHER PUBLICATIONS

"Teladesk", *House Beautiful*, Oct. 1973, p. 218.

*Primary Examiner*—G. Z. Rubinson
*Assistant Examiner*—L. C. Schroeder

[57] ABSTRACT

A rack for a wall-mounted telephone has an adjustable mounting structure, so that the rack may be mounted alongside different size telephones. The rack is also nestable within another similar rack to facilitate shipping and display of the racks. The rack may be used as a mini-data center independently of the telephone.

29 Claims, 7 Drawing Figures

RACK FOR A WALL-MOUNTED TELEPHONE

FIELD OF THE INVENTION

The present invention relates to racks which function as mini-data centers, and, more particularly, to such racks which are especially adapted for use in association with wall-mounted telephones.

BACKGROUND OF THE INVENTION

Several different types of racks have been developed for use in association with wall-mounted telephones. These racks generally include writing pads and pencil or pen holders, so that messages relating to telephone calls can be conveniently written down.

Many of the racks are designed to be positioned against the wall from which the telephone hangs (see, for instance, U.S. Pat. Nos. 3,085,134; 3,166,288; 3,266,819; 3,846,166 and 3,845,252). However, these racks are not adjustable to an extent sufficient to permit them to be used with different size telephones. The non-adjustability of the racks is a problem, inasmuch as there are presently many different size wall-mounted telephones commercially available. These racks also typically consist of a number of separate components which occupy a large volume of space. Thus, they are also difficult to ship and display in quantity.

SUMMARY OF THE INVENTION

The problems and disadvantages discussed above are overcome by the present invention which relates to a new and improved rack for a wall-mounted telephone. More particularly, the rack includes a body and a mounting structure designed to mount the body of the rack against a wall and alongside a telephone mounted from the wall. The mounting structure includes a substantially rigid arm having a shape selected such that the arm at least partially embraces the telephone. The body of the rack is releaseably and adjustably suspended from the arm, which may be fastened directly to the wall. Because the position of the arm is adjustable relative to the body of the rack, the arm can be adjusted to accomodate different size telephones.

In one embodiment, the body of the rack includes a storage compartment defined by a front wall, a top wall, a bottom wall, a pair of converging and diverging sidewalls and a rear wall. The rear wall is hingedly connected to the body of the rack such that the rear wall may pivot between a closed position in which the rear wall prevents access to the storage compartment from behind and an open position in which the rear wall permits access to the storage compartment from behind. When the rear wall is in its open position, the rack may be nested within another similar rack, thereby facilitating shipment and display of the racks.

In order to provide a complete information center, the body of the rack may be equipped with a calendar, a writing pad, a clock and a pen and pencil holder. The pad may be releasably attached to a cover for the storage compartment. By hingedly connecting the cover to the body of the rack, access to the storage compartment from above can be controlled by the cover. A suitable frame and housing may be provided for the calendar and the clock, respectively. The calendar frame, clock housing, cover and pen and pencil holder may be formed integrally with the body of the rack to provide a unitary structure, thereby facilitating assembly of the rack.

BRIEF DESCRIPTION OF THE DRAWINGS

For a more complete understanding of the present invention, reference may be had to the following detailed description of an exemplary embodiment considered in conjunction with the accompanying drawings, in which.

DESCRIPTION OF AN EXEMPLARY EMBODIMENT

Figure 1:
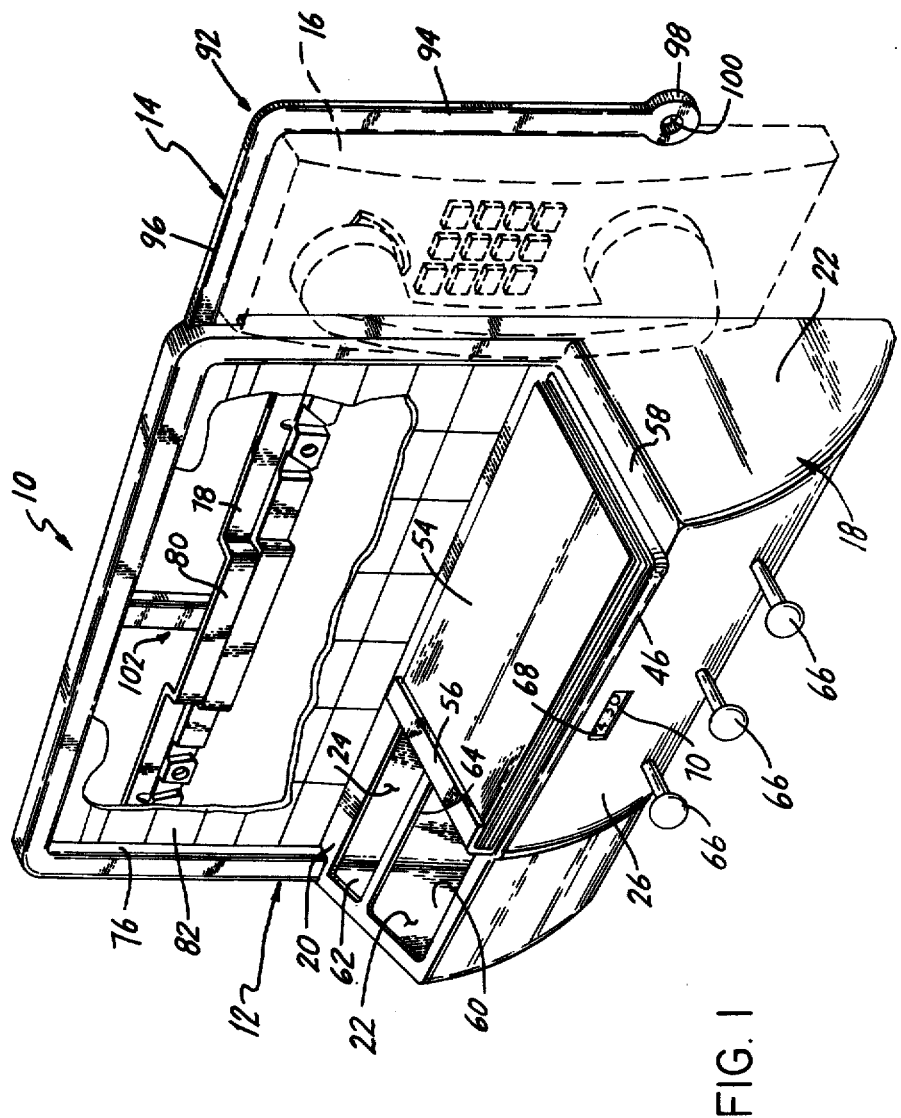
FIG. 1 is a perspective view of a rack constructed in accordance with the present invention, a portion of the rack being broken away to facilitate consideration and discussion.
Figure 2:
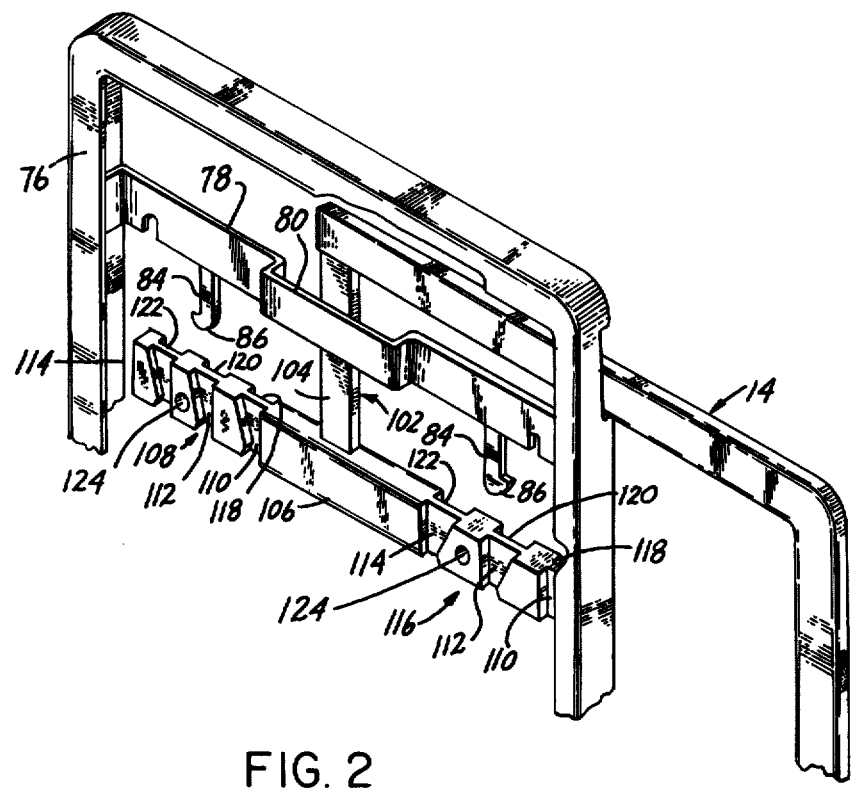
FIG. 2 is a partial perspective view of the rack illustrated in FIG. 1 with its mounting structure being disengaged from the rest of the rack.
Figure 3:
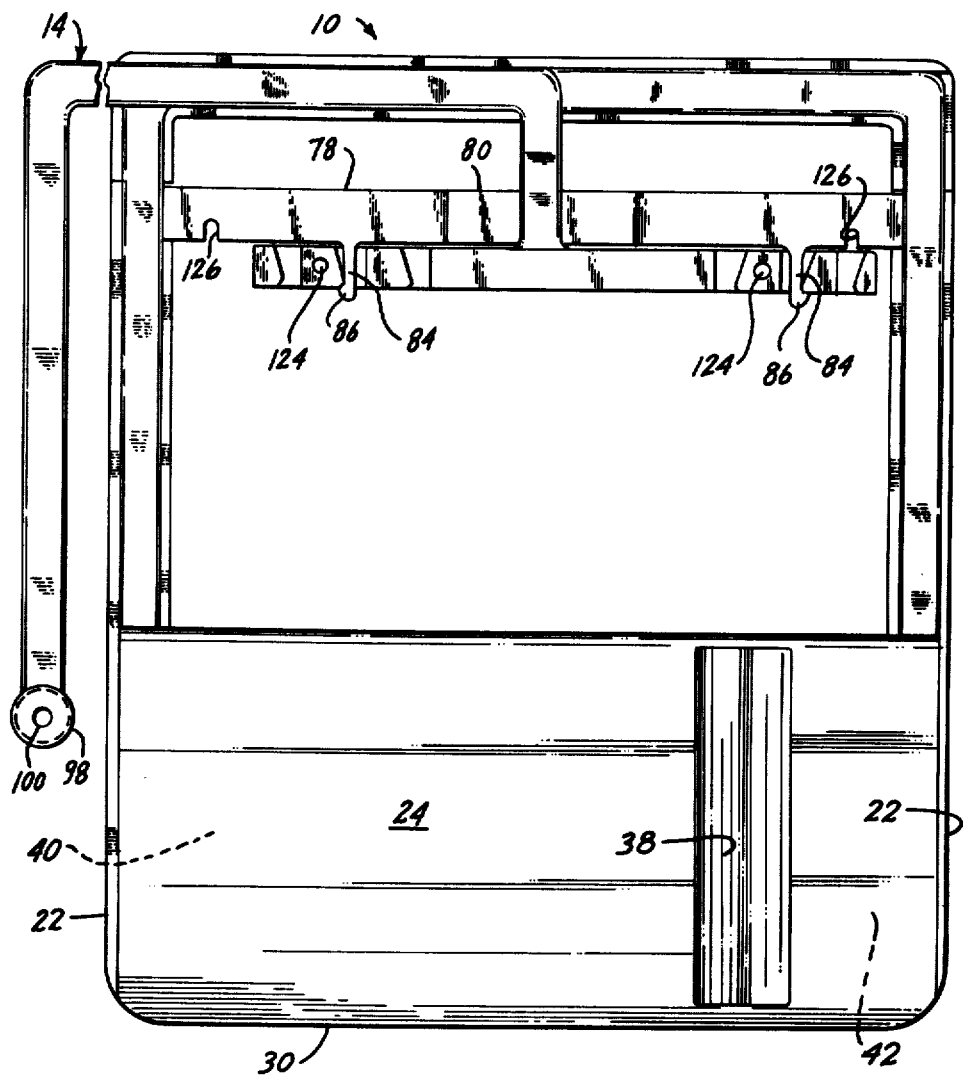
FIG. 3 is a rear elevational view of the rack shown in FIG. 1.

Referring to FIGS. 1–6 of the drawings, there is shown a rack 10 having a body 12 and a mounting arm 14 designed to hang the body 12 against a wall (not shown) and alongside a telephone 16 (illustrated by broken lines in FIG. 1). The body 12 and the mounting arm 14 are molded from a suitable plastic material, such as polypropylene.

The body 12 includes a storage compartment 18 defined by a top wall 20, a pair of converging and diverging sidewalls 22, a rear wall 24 and a curved outer wall 26, which functions as a front wall and a bottom wall for the storage compartment 18. Thus, it is seen that the top wall 20 and front wall component of the outer wall 26 define an apex therebetween with the sidewalls 22, 22 correspondingly diverging from said apex toward the bottom wall component of the outer wall 26 and the rear wall 24 and with the sidewalls 22, 22 being located in corresponding planes which converge in the direction from the rear wall 24 to the front wall component of the outer wall 26 (see FIGS. 1 and 4). The rear wall 24 is hingedly attached to a bottom edge 28 of the curved outer wall 26 by a live hinge 30 (see FIG. 4), whereby the rear wall 24 may be molded monolithically with the body 12.

Figure 4:
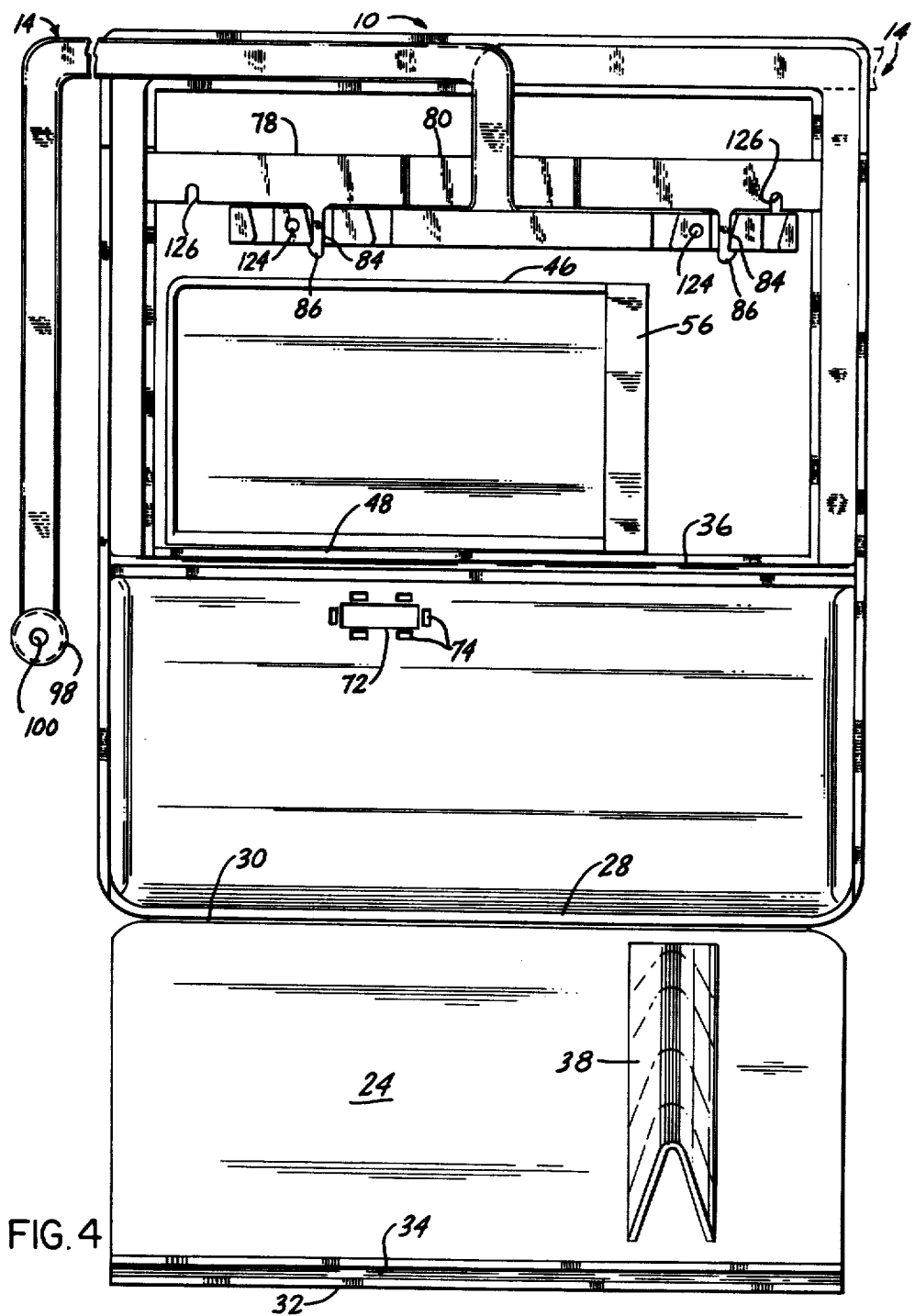
FIG. 4 is a rear elevational view of the rack with its storage compartment cover and rear wall in their open positions.
Figures 5, 6:
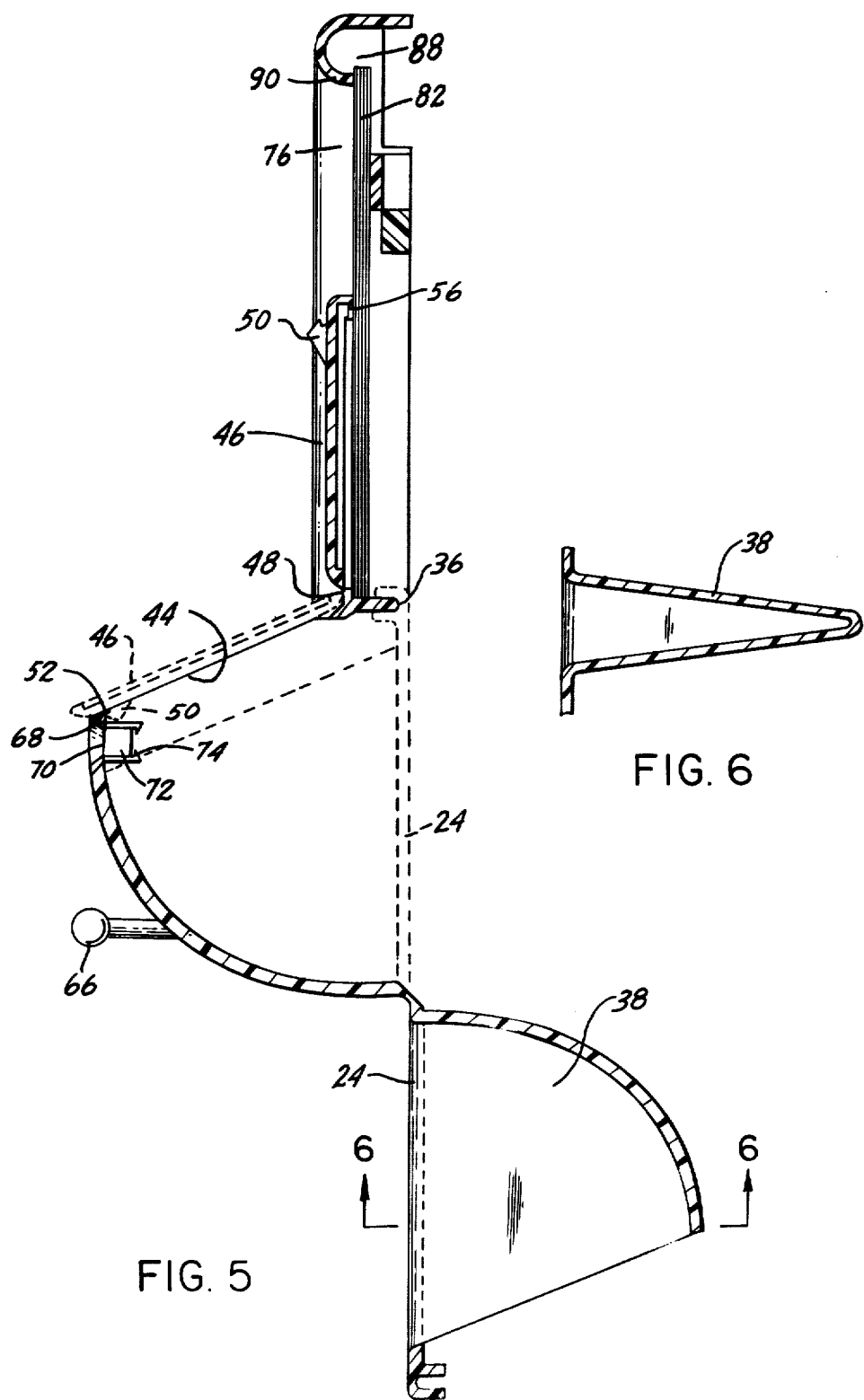
FIG. 5 is a cross-sectional view, taken along line I—I in FIG. 4 and looking in the direction of the arrows, of the rack illustrated in FIG. 4.
FIG. 6 is a cross-sectional view, taken along line II—II in FIG. 5 and looking in the direction of the arrows, of the rack illustrated in FIG. 5.

With particular reference to FIGS. 4–6, the live hinge 30 allows the rear wall 24 to pivot between a closed position (illustrated by broken lines in FIG. 5) in which the rear wall 24 prevents access to the storge compartment 18 from behind and an open position (illustrated by solid lines in FIGS. 4 and 5) in which the rear wall 24 permits access to the storage compartment 18 from behind. A free edge 32 of the rear wall 24 is provided with a U-shaped trough 34, which is designed to releasably grip a rear edge 36 of the top wall 20 to maintain the rear wall 24 in its closed position. The rear wall 24 is also provided with a V-shaped partition 38 which functions to provide the storage compartment 18 into a large storage well 40 and a small storage well 42 when the rear wall 24 is in its closed position.

The top wall 20 of the storage compartment 18 is provided with a large opening 44, which is located above the large storage well 40. A cover 46 overlies the opening 44 to control access to the large storage well 40 from above. The cover 46 is hingedly connected to the top wall 20 of the storage compartment 18 by a live hinge 48 (see FIGS. 4 and 5), whereby the cover 46 may be molded monolithically with the body 12.

With particular reference to FIGS. 4 and 5 the live hinge 48 allows the cover 46 to pivot between a closed position (illustrated by broken lines in FIG. 5) in which the cover 46 prevents access to the large storage well 40 from above and an open position (illustrated by solid lines in FIGS. 4 and 5) in which the cover 46 permits access to the large storage well 40 from above. A pair of latches 50 is provided on the cover 46. When the cover 46 is in its closed position, the latches 50 releaseably engage a lip 52 (see FIG. 4) provided on the curved outer wall 26 of the storage compartment 18 to maintain the cover 46 in its closed position.

The cover 46 is sized and shaped so as to receive a writing pad 54, which is releaseably attached to the cover 46 by a resilient clamp 56 formed integrally with the cover 46. In its closed position, the cover 46 is inclined at an angle which is determined by the angle of inclination of an inclined portion 58 of the top wall 20 of the storage compartment 18. The angle of inclination of the inclined portion 58 of the top wall 20 is selected such that the cover 46 and hence the pad 54 will be maintained in a comfortable writing position when the cover 46 is in its closed position.

Two smaller openings 60, 62 are provided in the top wall 20 of the storage compartment 18 above the small storage well 42. The opening 60 is sized and shaped so as to permit relatively short objects, such as pencils and pens, to be inserted into the small storage well 42. Larger objects, such as rulers, can be inserted into the small storage well 42 through the opening 62. A dividing bar 64 separates the openings 60, 62 from each other. The dividing bar 64 also functions to prevent objects which have been inserted into the small storage well 42 through the opening 62 from falling forward and bunching up with objects which have been inserted into the small storage well 42 through the opening 60.

A plurality of hangers 66 extend outwardly from the curved outer wall 26 of the storage compartment 18. Objects, such as key chains and personal telephone books, can be hung from the hangers 66, which are integrally molded with the body 12.

The curved outer wall 26 of the storage compartment 18 is also provided with a rectangular hole 68, which functions as a window for a face 70 of a small digital clock 72. The clock 72 is housed in an integrally molded housing 74 which extends into the large storage well 40 from the curved outer wall 26 of the storage compartment 18.

A calendar frame 76 extends upwardly from the top wall 20 of the storage compartment 18. The calendar frame 76 includes a crossbar 78, which extends across the calendar frame 76 from one side to another. The cross-bar 78 has an offset portion 80 which cooperates with the calendar frame 76 to mount a calendar 82 in the calendar frame 76. When the rear wall 24 of the storage compartment 18 is in its closed position, the U-shaped trough 34 on the rear wall 24 also cooperates with the calendar frame 76 and the offset portion 80 of the crossbar 78 to mount the calendar 82 in the calendar frame 76. A pair of resilient hooks 84 depends from the crossbar 78. Each of the hooks 84 has a prong 86 at its free end. The hooks 84 are designed to releaseably couple the body 12 to the mounting arm 14 in a manner to be described hereinafter. An open-ended channel 88 is formed in an upper edge 90 of the calendar frame 76 to moveably receive the mounting arm 14.

The mounting arm 14 includes an L-shaped section 92 which is designed to embrace the telephone (see FIG. 1). More particularly, the L-shaped section 92 has a vertical leg 94, which is positioned adjacent to one side of the telephone 16, and a horizontal leg 96, which is positioned above the telephone 16. The vertical leg 94 terminates in a mounting ring 98, having an aperture 100 adapted to receive a fastener (not shown), such as a screw, for attaching the mounting arm 14 to a wall or a similar support surface. Alternatively, a weighted item, such as a telephone book, can be hung from the mounting ring 98 to hold the mounting arm 14 in place.

The mounting arm 14 also includes an inverted T-shaped section 102, which depends from the horizontal leg 96 of the L-shaped section 92. The inverted T-shaped section 102 is formed integrally with the L-shaped section 92, whereby the mounting arm 14 is a unitary structure. The inverted T-shaped section 102 includes a vertical leg 104 and a horizontal leg 106. One side 108 of the horizontal leg 106 of the inverted T-shaped section 102 is provided with a first pair of slots 110, a second pair of slots 112 and a third pair of slots 114. As shown in FIGS. 1 and 3–5, the hooks 84 carried by the crossbar 78 of the calendar frame 76 are releaseably received in the slots 112 with the prongs 86 releaseably coupling the crossbar 78 to the horizontal leg 106 of the inverted T-shaped section 102 of the mounting arm 14. The spacing between the slots 112 is the same as the spacing between the slots 110, so that the hooks 84, upon their withdrawal from the slots 112, can be releaseably received in the slots 110. The spacing between the slots 112 is also the same as the spacing between the slots 114 so that the hooks 84, upon their withdrawal from the slots 112 or the slots 110, can be releaseably received in the slots 114.

An opposite side 116 of the horizontal leg 106 of the inverted T-shaped section 102 is provided with a fourth pair of slots 118, a fifth pair of slots 120 and a sixth pair of slots 122. The slots 118, 120, 122 correspond to the slots 110, 112, 114, respectively. The slots 118, 120, 122 are provided so that the mounting arm 14 can extend from an opposite side of the body 12 (see the broken lines in FIG. 4), whereby the body 12 may be mounted to the left or right of the telephone 16.

Mounting holes 124 extend through the horizontal leg 106 of the inverted T-shaped section 102 of the mounting arm 14. The mounting holes 124 receive fasteners (not shown), such as screws, for fixedly attaching the mounting arm 14 to a wall or a similar support surface. When the hooks 84 are fully inserted into the slots 112, the crossbar 78 of the calendar frame 76 rests on the horizontal leg 106 of the inverted T-shaped section 102, whereby the body 12 is suspended from the mounting arm 14. The offset portion 80 of the crossbar 78 is provided so that the vertical leg 104 of the inverted T-shaped section 102 can pass freely behind the crossbar 78 during the coupling and uncoupling of the body 12 to the mounting arm 14 (see FIG. 2). When the body 12 is suspended from the mounting arm 14, the prongs 86 on the hooks 84 releaseably engage the horizontal leg 106 of the inverted T-shaped section 102 of the mounting arm 14 to inhibit the body 12 from being accidentally uncoupled from the mounting arm 14. The slots 110, 112, 114, 118, 120, 122 are tapered so as to facilitate the insertion of the hooks 84.

In order to disengage the hooks 84 from the slots 112, the body 12 is pushed to the left or right until the prong 86 on one of the hooks 84 is disengaged from the horizontal leg 106 of the inverted T-shaped section 102. One side of the body 12 can then be raised until the disengaged hook 84 is completely withdrawn from its corresponding slot 112, thereby permitting the body 12 to be pushed in an opposite direction to disengage the prong 86 on the other hook 84 from the horizontal leg 106 of the inverted T-shaped section 102. With both of the prongs 86 disengaged, the body 12 can then be lifted off of the mounting arm 14. Once the body 12 has been removed from the mounting arm 14, the body 12 can be hung independently of the mounting arm 14 and the telephone 16. Mounting slots 126 adapted to receive fasteners, such as screws, are provided on the crossbar 78 of the calendar frame 76 for this purpose.

In order to adjust the rack so that it will accomodate a wider telephone, the hooks 84 can be inserted into the slots 110 to thereby increase the distance between the body 12 and the vertical leg 94 of the L-shaped section 92 of the mounting arm 14. By inserting the hooks 84 into the slots 114, the distance between the body 12 and the vertical leg 94 of the L-shaped section 92 of the mounting arm 14 can be decreased so that the rack 10 will accomodate a more narrow telephone. Thus, the rack 10 may accomodate three different size telephones.

Figure 7:
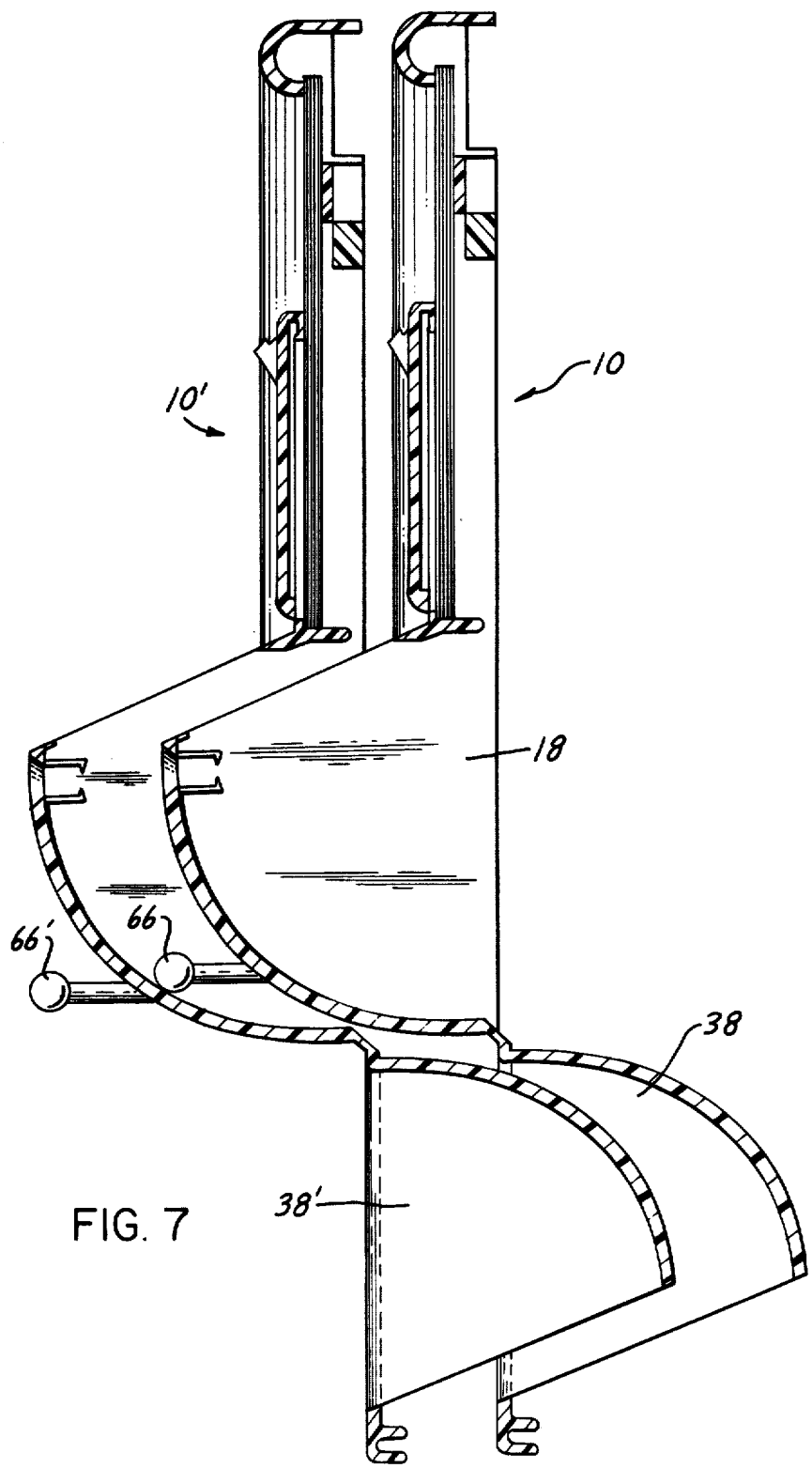
FIG. 7 is a cross-sectional view similar to FIG. 5 showing two identical racks nested one inside the other.

Referring to FIG. 7, when the rear wall 24 of the storage compartment 18 is in its open position, the rack 10 may be nested inside another identical rack 10'. By nesting the racks 10, 10' one inside the other, they can be more easily shipped and displayed. The converging and diverging sidewalls 22, the curved outer wall 26 and the V-shaped partition 38 on the rear wall 24 facilitate the stackability of the rack 10 (see FIGS. 4-6).

It will be understood that the embodiment described herein is merely exemplary and that a person skilled in the art may make many variations and modifications without departing from the spirit and the scope of the invention. For instance, the mounting arm 14 can be infinitely adjustable. All such modifications and variations are intended to be included within the scope of the invention as defined in the appended claims.

I claim:

1. A rack for a wall-mounted telephone, comprising a body and mounting means for mounting said body against a wall and alongside a telephone mounted from the wall, said body including a storage compartment defined by a front wall, a bottom wall, a top wall, a pair of converging and diverging sidewalls, and a rear wall hingedly connected to said body, such that said top wall and front wall define an apex therebetween with said side walls correspondingly diverging from said apex toward said bottom wall and said rear wall and with said side walls being located in corresponding planes which converge in the direction from said rear wall to said front wall, and such that said rear wall is pivotable between a closed position in which said rear wall prevents access to said storage compartment from behind and an open position in which said rear wall permits access to said storage compartment from behind, whereby said rack may be nested in another similar rack when said rear wall is in its open position.

2. A rack according to claim 1, wherein said mounting means includes a substantially rigid arm, having a shape selected such that said arm at least partially embraces the telephone, and suspending means for releaseably and adjustably suspending said body from said arm.

3. A rack according to claim 2, wherein said arm includes a generally L-shaped section, having a first leg positioned adjacent to one side of the telephone and a second leg positioned above the telephone.

4. A rack according to claim 3, wherein said suspending means includes a first coupling member depending from said second leg of said L-shaped section of said arm and a second coupling member carried by said body and releaseably attached to said first coupling member.

5. A rack according to claim 4, wherein said second coupling member includes a pair of hooks and said first coupling member includes at least two pairs of slots, each pair of slots being sized and shaped so as to releaseably receive said hooks, whereby the position of said arm relative to said body depends upon which pair of slots receives said hooks.

6. A rack according to claim 5, wherein said slots are positioned on said first coupling member such that each pair of slots corresponds to a different size telephone, whereby the position of said arm relative to said body can be adjusted to accomodate different size telephones.

7. A rack according to claim 6, wherein said first coupling member includes three pairs of slots.

8. A rack according to claim 6, wherein said arm includes an inverted T-shaped section depending from said second leg of said L-shaped section of said arm, said slots being formed in said inverted T-shaped section.

9. A rack according to claim 3, wherein said body includes a first channel provided on one side of said body and a second channel provided on an opposite side of said body, each of said first and second channels being sized and shaped so as to moveably receive said second leg of said L-shaped section of said arm, whereby said body can be hung from either side of the telephone.

10. A rack according to claim 2, wherein said mounting means includes fastening means for fastening said arm to the wall.

11. A rack according to claim 1, wherein said body includes a mounting frame for a calendar, said mounting frame extending upwardly from said top wall of said storage compartment.

12. A rack according to claim 1 or 11, wherein said body includes dividing means for dividing said storage compartment into first and second storage wells when said rear wall is in its closed position.

13. A rack according to claim 12, wherein said dividing means includes a V-shaped partition attached to said rear wall of said storage compartment and formed integrally therewith.

14. A rack according to claim 12, wherein said body includes a first opening provided in said top wall of said storage compartment above said first storage well and a cover hingedly connected to said top wall of said storage compartment such that said cover is pivotable between a closed position in which said cover prevents access to said first storage well through said first opening and an open position in which said cover permits access to said first storage well through said first opening.

15. A rack according to claim 14, wherein said cover is formed integrally with said body.

16. A rack according to claim 14, wherein said cover includes attaching means for removeably attaching a writing pad to said cover.

17. A rack according to claim 14, wherein said cover includes locking means for releasably locking said cover to said top wall of said storage compartment when said cover is in its closed position.

18. A rack according to claim 14, wherein said body includes second and third openings provided in said top wall of said storage compartment, said second and third openings being located above said second storage well to provide access to said second storage well from above.

19. A rack according to claim 1 or 11, wherein said body includes housing means for housing a clock.

20. A rack according to claim 19, wherein said housing means is positioned on said front wall of said storage compartment.

21. A rack according to claim 1 or 11, wherein said body includes hanging means for hanging objects from said body.

22. A rack according to claim 21, wherein said hanging means includes a plurality of hangers extending outwardly from said front wall of said storage compartment.

23. A rack according to claim 1, wherein said rear wall is formed integrally with said body.

24. A rack according to claim 23, wherein said storage compartment includes a curved outer wall, having an upper portion which forms said front wall of said storage compartment and a lower portion which forms said bottom wall of said storage compartment.

25. A rack according to claim 24, wherein said rear wall is hingedly attached to said lower portion of said outer curved wall of said storage compartment.

26. A rack according to claim 25, wherein said body includes locking means for releaseably locking said rear wall in its closed position.

27. A rack according to claim 26, wherein said locking means includes gripping means provided on said rear wall for releaseably gripping said top wall of said storage compartment when said rear wall is in its closed position.

28. A rack according to claim 1, wherein said top wall includes an inclined portion, having an angle of inclination selected such that said inclined portion is conveniently arranged for writing purposes.

29. A rack for a wall-mounted telephone, comprising a body and mounting means for mounting said body against a wall and alongside a telephone mounted from the wall, said body including a storage compartment defined by a front wall, a bottom wall, a top wall, a pair of converging and diverging sidewalls, and a rear wall connectable to said body, such that said top wall and front wall define an apex therebetween with said side walls correspondingly diverging from said apex toward said bottom wall and said rear wall and with said side walls being located in corresponding planes which converge in the direction from said rear wall to said front wall, and such that said rear wall is movable from a closed position in which said rear wall prevents access to said storage compartment from behind and an open position in which access to said storage compartment is permitted from behind, whereby said rack may be nested in another similar rack.

* * * * *